Feb. 17, 1942. T. J. BAY Re. 22,027

CONDENSER TUBE PROTECTOR

Original Filed Jan. 8, 1940

INVENTOR
THOMAS J. BAY
BY W. Glenn Jones
ATTORNEY

Reissued Feb. 17, 1942

Re. 22,027

UNITED STATES PATENT OFFICE 22,027

CONDENSER TUBE PROTECTOR

Thomas J. Bay, United States Navy

Original No. 2,225,615, dated December 24, 1940, Serial No. 312,941, January 8, 1940. Application for reissue December 23, 1941, Serial No. 424,171

5 Claims. (Cl. 285—54)

Figures 1, 2:
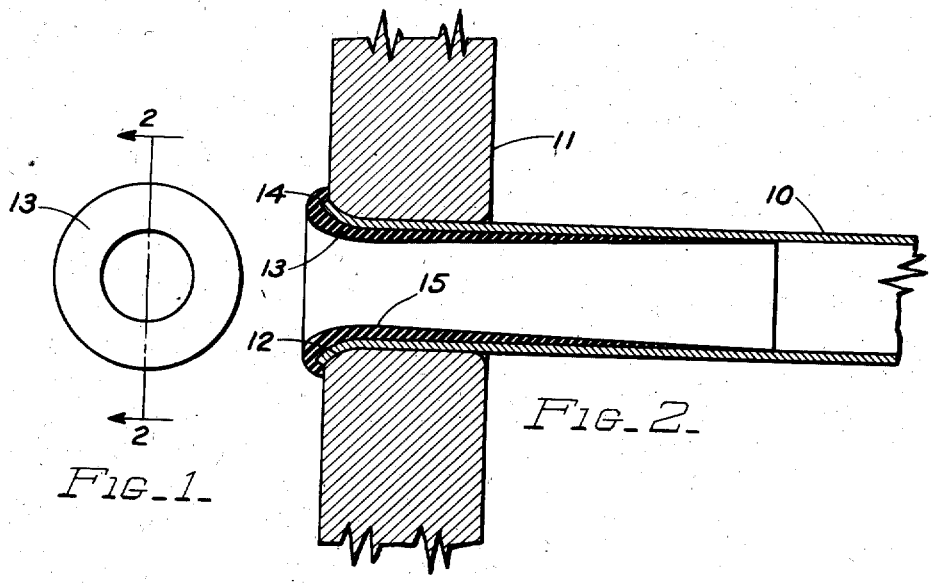

(Granted under the act of March 3, 1883, as amended April 30, 1928; 370 O. G. 757)

This invention relates to condenser tubes and it has a particular relation to inserts for preventing the corrosion of the tubes adjacent to their inlet ends by the water passing therethrough.

Modern condenser design makes use of high water velocities in the condenser tubes in order to secure improved heat transfer rates of the cooling surface and thereby reduce the size of the unit required for a given heat load. These high water velocities cause the early failure of the inlet ends of the condenser tubes due to impingement erosion and electro-chemical corrosion of the tube material. This action is especially severe in condensers employing tubes which are rolled and expanded into the condenser header plates, as the cold working of the tube material at the inlet end of the tube serves to weaken it structurally and produce fatigue so that its resistance to the destructive forces imposed by the high velocity of the water entering the tube is reduced.

These disadvantages were overcome by constructing the protectors of soft rubber, as disclosed in my Patent No. 2,157,107, granted May 9, 1939, but some difficulty has been experienced in inserting the protectors in the inlet ends of the condenser tubes. This difficulty was caused by the fact that types of cements adequate to properly secure the protectors in position would freeze to the metal of the tube immediately upon contact therewith, with the result that the soft material of the protector would buckle in attempting to force it into its final position within the tube. When it is considered that a modern surface condenser contains several thousand tubes, each of which must be equipped with a protector, the delay occasioned by the above mentioned freezing and buckling will immediately be apparent.

The principal object of the present invention is the provision of a condenser tube insert having not only improved impingement erosion and electrochemical corrosion resisting characteristics over the protector which is the subject of my above mentioned patent but which is relatively rigid and self-supporting longitudinally and capable of being quickly and easily positioned in the inlet end of a condenser tube with a light drive fit even when coated with cement.

Another object of the invention is the provision of a condenser tube protector of the character described which is fabricated from a thermo-setting infusible material such as a phenol-formaldehyde product, or hard rubber having the proper percentage of sulphur and capable of withstanding the relatively high temperatures encountered without softening.

A further and important object of the invention is the provision of a protector insert fabricated from a phenolic material of the thermo-setting type which may be secured in a condenser tube with a drive fit and which has the additional function of also being capable of use with a thermo-setting cement if so desired, that is to say, a cement which sets only when subjected to heat.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing, means for carrying the invention into practical use, without limiting the improvements in their useful application to the particular construction, which, for the purpose of explanation, have been made the subject of illustration.

In the accompanying drawing:

Fig. 1 is an end elevational view of a condenser tube protector constructed in accordance with the present invention, and Fig. 2 is a longitudinal sectional view taken on line 2—2 of Fig. 1.

Referring to the drawing, a condenser tube 10 is shown as being secured in a header plate 11 of a surface condenser, the outer or inlet end of the tube being flared as indicated at 12. A tubular corrosion protector 13 fabricated from a material which is chemically inert with respect to the metal of the tube and header plate, such as phenol-formaldehyde, or hard rubber having the proper proportion of sulphur, is secured within the inlet end of the condenser tube 10 by cement. The outer end of the protector 13 is flared and curved inwardly as at 14, so as to enclose the outer flared end 12 of the tube so as to effectively seal the juncture of the tube and plate against any electro-chemical action of the water or other electrolyte passing through the tube. The protector 13 is contoured so as to provide a restricted throat 15 and its internal diameter increases inwardly until it merges with the outside wall of the protector, thus forming a feathered inner edge. The contour of the throat 15 corresponds substantially to the contraction and enlargement of a stream of water passing through an orifice, thereby minimizing turbulence and the liberation of air from the water and also eliminates impingement erosion and friction loss in the jet of water entering the tube.

In assembly, the faying surfaces of the tube and the protector are coated with a suitable cement and the protector tapped into its seating position within the tube, the exterior diameter of the protector being such as to provide a light drive fit. The relatively thin wall of the protector is sufficiently flexible in a radial direction to conform to the cross-sectional contour of the tube 10 in the event that the latter is slightly out of round but the protector is sufficiently rigid or self-supporting in a longitudinal direction to prevent buckling when the tacky cement contacts with and freezes to the wall of the tube 10.

A protector insert molded from phenol-formaldehyde is sufficiently stiff or rigid to enable a rapid assembly of the protectors in the condenser tubes and is, at the same time, sufficiently tough, elastic, and chemically inert to eliminate impingement erosion and chemical corrosion heretofore encountered. This material, being thermo-setting, is relatively infusible and capable of withstanding the relatively high temperatures encountered without softening. Also, it lends itself readily to the use of a thermo-setting cement for securing the protectors in the condenser tubes. When such a cement is employed the protectors may be inserted in all of the tubes and then live steam admitted to the vapor space of the condenser, the heat of the steam setting the cement of all of the protectors at the same time. This type of cement cannot, however, be used successfully with soft rubber protector inserts which require the tacky, self-setting cement hereinbefore described. A protector insert fabricated from hard rubber having the proper sulphur content may, however, be used with a thermo-setting cement if desired.

From the foregoing it will be apparent that a protector insert is provided that possesses all of the advantages of the protector disclosed in my aforesaid patent and at the same time one of a type that may quickly and easily be applied to the many tubes of a surface condenser by unskilled labor and with a material saving in time and expense.

It will be understood that the above description and accompanying drawing comprehend only the general and preferred embodiment of the invention and that various changes in construction, proportion and arrangement of the parts may be made within the scope of the appended claims without sacrificing any of the advantages of the invention.

The invention described herein may be manufactured and/or used by or for the Government of the United States of America for governmental purposes without the payment of any royalties thereon or therefor.

I claim:

1. Means for protecting from corrosion and erosion the inlet end of a tube extending through a header plate of a surface condenser comprising a tubular insert of substantially infusible, thermo-setting material which is resistant to corrosion and capable of retaining its initial hardness in the presence of salt water and heat, said insert having sufficient longitudinal rigidity to permit it to be forced into the inlet end of said tube and sufficiently deformable radially to closely conform to irregularities in the cross-sectional contour thereof, for absorbing the impact of media entering said tube.

2. Means for protecting from corrosion and erosion the inlet end of a tube extending through a header plate of a surface condenser comprising a tubular insert of phenolic material of the thermo-setting type which is resistant to corrosion and capable of retaining its initial hardness in the presence of salt water and heat, said insert having sufficient longitudinal rigidity to permit it to be forced into the inlet end of said tube and sufficiently deformable radially to closely conform to irregularities in the cross-sectional contour thereof for absorbing the impact of media entering said tube.

3. Means for protecting from corrosion and errosion the inlet end of a tube extending through a header plate of a surface condenser comprising a tubular insert of hard rubber which is resistant to corrosion and capable of retaining its initial hardness in the presence of salt water and heat, said insert having sufficient longitudinal rigidity to permit it to be forced into the inlet end of said tube and sufficiently deformable radially to closely conform to irregularities in the cross-sectional contour thereof for absorbing the impact of media entering said tube.

4. Means for protecting from corrosion and erosion the inlet end of a tube extending through a header plate of a surface condenser comprising a tubular insert composed of a non-metallic material having a relatively low burning rate and which is resistant to corrosion and capable of retaining its initial hardness in the presence of salt water and heat, said insert having sufficient longitudinal rigidity to permit it to be forced into the inlet end of said tube and sufficiently deformable radially to closely conform to irregularities in the cross-sectional contour thereof, for absorbing the impact of media entering said tube.

5. Means for protecting from corrosion and erosion the inlet end of a tube extending through a header plate of a surface condenser comprising a tubular insert composed of a non-metallic material having a burning rate considerably less than that of the Celluloid, and which is resistant to corrosion and capable of retaining its initial hardness in the presence of salt water and heat, said insert having sufficient longitudinal regidity to permit it to be forced into the inlet end of said tube and sufficiently deformable radially to closely conform to irregularities in the cross-sectional contour thereof, for absorbing the impact of media entering said tube.

THOMAS J. BAY.